(12) United States Patent
Houck et al.

(10) Patent No.: US 10,967,838 B2
(45) Date of Patent: Apr. 6, 2021

(54) VARIABLE CURVATURE WIPER

(71) Applicant: GM Global Technology Operations LLC, Detroit, MI (US)

(72) Inventors: Thomas E. Houck, Bloomfield Hills, MI (US); James G. Gobart, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 16/298,614

(22) Filed: Mar. 11, 2019

(65) Prior Publication Data

US 2020/0290571 A1 Sep. 17, 2020

(51) Int. Cl.
  *B60S 1/38* (2006.01)
  *B60S 1/34* (2006.01)

(52) U.S. Cl.
  CPC .......... *B60S 1/3801* (2013.01); *B60S 1/3411* (2013.01); *B60S 1/3486* (2013.01); *B60S 1/34* (2013.01); *B60S 2001/382* (2013.01); *B60S 2001/3813* (2013.01)

(58) Field of Classification Search
  CPC .. B60S 1/40; B60S 1/34; B60S 1/3486; B60S 1/3472; B60S 1/347; B60S 1/3463; B60S 1/3411; B60S 1/3801; B60S 1/3459; B60S 1/3406; B60S 2001/3813; B60S 2001/382; B60S 2001/3812
  USPC .............................. 15/250.32, 250.23, 250.43
  See application file for complete search history.

(56) References Cited

U.S. PATENT DOCUMENTS

| | | | | |
|---|---|---|---|---|
| 2,276,556 A | * | 3/1942 | Max ...................... | B60S 1/4038 15/250.32 |
| 2,537,411 A | * | 1/1951 | Klingler .................. | B60S 1/40 15/250.23 |
| 2,800,676 A | * | 7/1957 | Makela .................... | B60S 1/34 15/250.23 |
| 2,820,238 A | * | 1/1958 | Roth ..................... | B60S 1/4006 15/250.23 |
| 2,871,501 A | * | 2/1959 | Wernig ................. | B60S 1/3849 15/250.23 |

(Continued)

FOREIGN PATENT DOCUMENTS

| | | | |
|---|---|---|---|
| DE | 102009022591 | * | 12/2010 |
| GB | 897530 | * | 5/1962 |

OTHER PUBLICATIONS

Machine translation of description portion of German publication 102009022591, published Dec. 2010. (Year: 2010).*

*Primary Examiner* — Gary K. Graham

(57) ABSTRACT

A variable curvature wiper comprises a wiper arm with a first and second distal ends. The first distal end is pivotally supported on a pivot post. A flexible wiper blade has a first end, a second end and a mounting hub. The mounting hub is pivotally attached to the second distal end of the wiper arm. A first push rod includes a first end attached to the first end of the wiper blade and a second end attached to a push rod pivot point. The push rod pivot point is spaced from the pivot post axis. Pivotal motion of the wiper arm about the pivot post axis in a first direction causes the first push rod to push against the first end and flex the wiper blade. Pivotal motion of the wiper arm about the pivot post axis in a second direction causes the first push rod to pull the first end of the wiper blade back toward a flat position.

19 Claims, 3 Drawing Sheets

(56) References Cited

U.S. PATENT DOCUMENTS 3,042,953 A * 7/1962 Batley .................. B60S 1/4038
15/250.202
4,791,696 A * 12/1988 Durtnal ................. B60S 1/3409
15/250.23

* cited by examiner

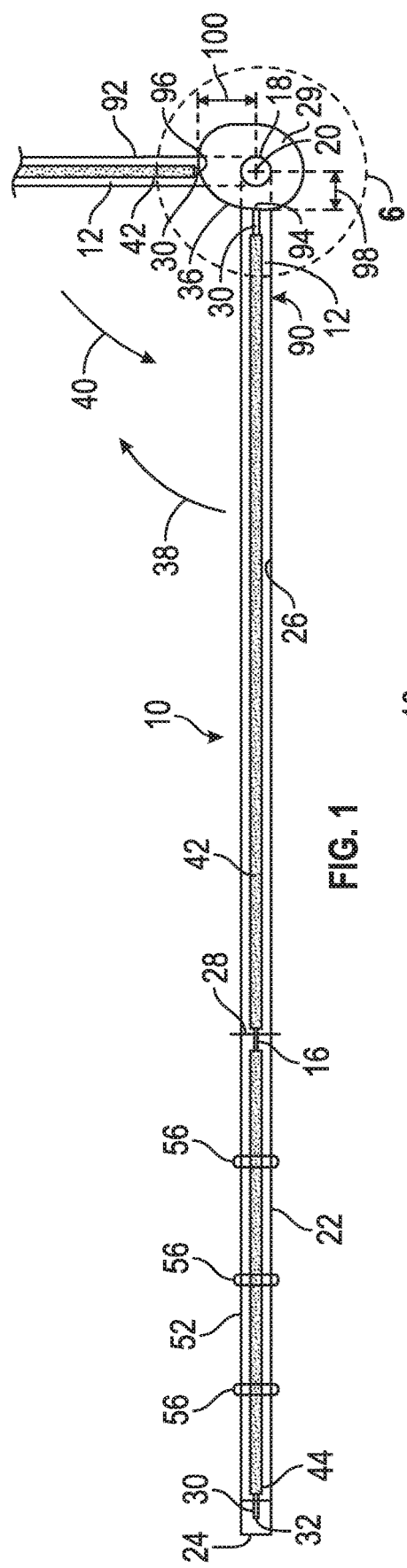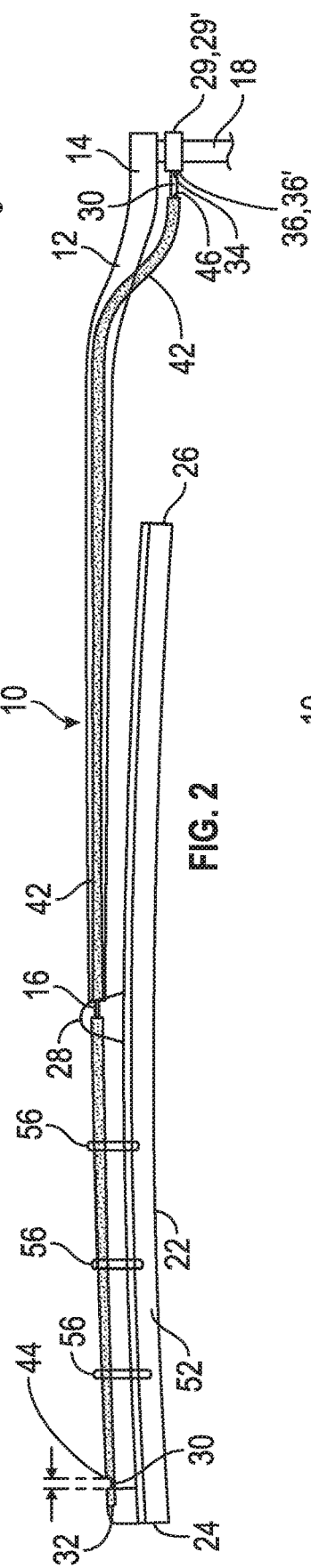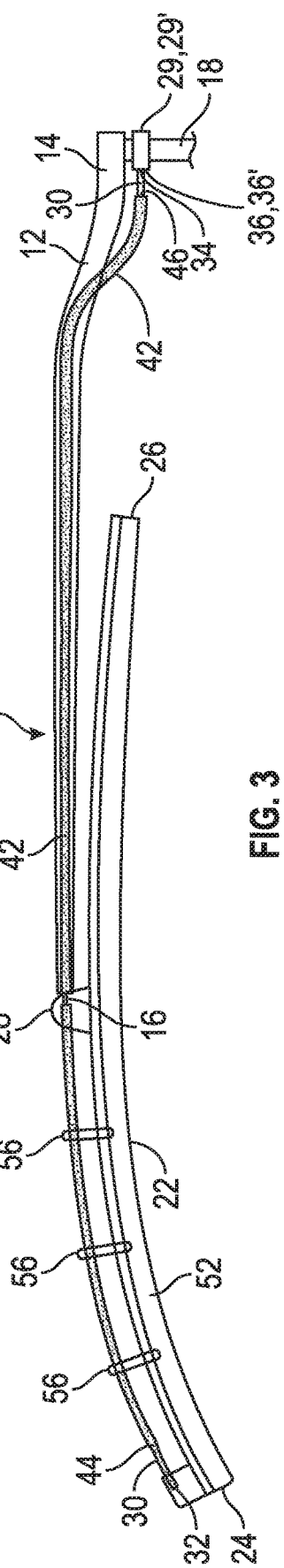

VARIABLE CURVATURE WIPER

INTRODUCTION

The present disclosure relates to a variable curvature wiper for the windshield wiper mechanism of an automobile. Windshield wipers exist that allow the wiper to flex to accommodate a curved windshield profile. If the blade is too flexible, then it will not engage the windshield with enough force to ensure that the wiper blade remains in firm contact with the windshield as the wiper moves across the windshield and the wiper blade encounters varying curved profiles. Some windshield wipers are curved so that when the wiper blade engages a windshield there is some tension in the wiper blade to keep the wiper blade engaged with the windshield. If the wiper blade is curved to dramatically however, the curved shape of the wiper blade may keep the middle section of the wiper blade from effectively engaging the flatter portions of the windshield.

Thus, while current wiper blades achieve their intended purpose, there is a need for a new and improved wiper blade that not only is able to flex and remain in contact with a windshield that has a compound curved profile, but forces the wiper blade to flex toward the surface of the windshield as the wiper arm moves through a range of motion.

SUMMARY

According to several aspects of the present disclosure, a variable curvature wiper for an automobile, comprises a wiper arm having a first distal end and a second distal end. The first distal end is pivotally supported on a pivot post and the wiper arm pivots about a pivot post axis. A flexible wiper blade has a first end, a second end and a mounting hub positioned between the first and second ends. The mounting hub is pivotally attached to the second distal end of the wiper arm. A cam is fixedly mounted onto the pivot post. A first push rod has a first end attached to the first end of the wiper blade and a second end in slidable engagement with a cam surface of the cam. Wherein, pivotal motion of the wiper arm about the pivot post axis in a first direction decreases the distance between the cam surface and the first end of the wiper blade, causing the cam surface to push against the first push rod and causing the first push rod to push against the first end of the wiper blade and flexing the wiper blade away from a substantially flat position. Further wherein, pivotal motion of the wiper arm about the pivot post axis in a second direction increases the distance between the cam surface and the first end of the wiper blade.

According to another aspect of the present disclosure, the variable curvature wiper further includes a first hollow tube supported on the wiper arm and the wiper blade. The first hollow tube includes a first end fixedly attached to the wiper blade at a distance from the first end of the wiper blade and a second end fixedly attached to the wiper arm at a distance from the first distal end of the wiper arm. The first push rod is slidably supported within the first hollow tube. The first end of the first push rod extends from the first end of the first hollow tube and the second end of the first push rod extends from the second end of the first hollow tube. Wherein, pivotal motion of the wiper arm about the pivot post axis in the first direction decreases the distance between the cam surface and the second end of the first hollow tube, causing the first push rod to slide into the second end of the first hollow tube, extend further out from the first end of the first hollow tube and push against the first end of the wiper blade, and flex the wiper blade away from a substantially flat position. Further wherein, pivotal motion of the wiper arm about the pivot post axis in the second direction increases the distance between the cam surface and the second end of the first hollow tube.

According to another aspect of the present disclosure, the wiper arm pivots about the pivot post axis in a first plane extending through the wiper arm, and the wiper blade pivots about the second distal end of the wiper arm in a second plane extending through the wiper arm substantially perpendicular to the first plane.

According to another aspect of the present disclosure, the wiper blade includes a first section extending between the first end of the wiper blade and the mounting hub, and a second section extending between the mounting hub and the second end of the wiper blade. Wherein, when the first push rod pushes the first end of the wiper blade, the first section of the wiper blade flexes, and the second section of the wiper blade remains substantially flat.

According to another aspect of the present disclosure, the variable curvature wiper further includes a plurality of stand-offs spaced along a top surface of the first section of the wiper blade, wherein the first hollow tube is supported by the plurality of stand-offs.

According to another aspect of the present disclosure, the first push rod is made from a material that does not allow the first push rod to stretch or to compress, and is flexible. Wherein, the first push rod flexes as the wiper blade flexes, and pushing and pulling forces on the first push rod are transmitted to the first end of the wiper blade.

According to another aspect of the present disclosure, the variable curvature wiper further includes a lever hub pivotally mounted at the second distal end of the wiper arm and pivotal about a common axis with the wiper blade and independently of the wiper blade. The lever hub includes a first lever arm extending from the lever hub and a second lever arm extending from the lever hub, opposite the first lever arm. A second push rod includes a first end attached to the second end of the wiper blade and a second end attached to the second lever arm. The first lever arm is pivotally attached to the first push rod. Wherein, when the first push rod slides toward the first end of the wiper blade the lever hub rotates and the second lever arm pushes the second push rod toward the second end of the wiper blade, flexing the second section of the wiper blade away from a substantially flat position. Further wherein, when the first push rod slides away from the first end of the wiper blade, the lever hub rotates and the second lever arm pulls the second push rod away from the second end of the wiper blade, flexing the second section of the wiper blade back toward a substantially flat position.

According to another aspect of the present disclosure, the first hollow tube includes a cut-out section to allow attachment of the first lever arm to the first push rod.

According to another aspect of the present disclosure, the variable curvature wiper further includes a second hollow tube supported on the second section of the wiper blade. The second hollow tube includes a first end fixedly attached to the second section of the wiper blade at a distance from the second end of the wiper blade and a second end attached to the second section of the wiper blade at a distance from the lever hub. Wherein, the second push rod is slidably supported within the second hollow tube, the first end of the second push rod extending from the first end of the second hollow tube and the second end of the second push rod extending from the second end of the second hollow tube.

According to another aspect of the present disclosure, the first and second sections of the wiper blade flex within the second plane extending through the wiper arm substantially perpendicular to the first plane.

According to another aspect of the present disclosure, the wiper blade is adapted to allow the first and second sections of the wiper blade to flex within the second plane to a compound curved shape.

According to another aspect of the present disclosure, the variable curvature wiper further includes a plurality of stand-offs spaced along a top surface of the second section of the wiper blade. The second hollow tube is supported by the plurality of stand-offs.

According to another aspect of the present disclosure, the second push rod is made from a material that does not allow the second push rod to stretch or to compress, and is flexible. Wherein the second push rod flexes as the wiper blade flexes, and pushing and pulling forces on the second push rod are transmitted to the second end of the wiper blade.

According to another aspect of the present disclosure, the cam has an offset curved shape, the first push rod slidably engaging the cam surface at a first point when the wiper arm is in the first position and the first push rod slideably engaging the cam surface at a second point when the wiper arm is in the second position.

According to another aspect of the present disclosure, the distance between the cam surface and the pivot post axis at the first point is less than the distance between the cam surface and the pivot post axis at the second point.

According to another aspect of the present disclosure, the distance between the cam surface and the pivot post axis gradually increases between the first and second points.

According to another aspect of the present disclosure, the second end of the push rod is slidably attached to the cam surface of the cam; wherein pivotal motion of the wiper arm about the pivot post axis in a first direction decreases the distance between the cam surface and the first end of the wiper blade, causing the cam surface to push against the first push rod and causing the first push rod to push against the first end of the wiper blade and flexing the wiper blade away from a substantially flat position, and pivotal motion of the wiper arm about the pivot post axis in a second direction increases the distance between the cam surface and the first end of the wiper blade causing the cam surface to pull the first push rod and the first end of the wiper blade and flexing the wiper blade back toward a substantially flat position.

According to another aspect of the present disclosure, the the cam includes a slot formed therein and the second end of the first push rod is slideably supported within the slot.

According to another aspect of the present disclosure, the cam and the slot formed therein has an offset curved shape, the second end of the first push rod slidably supported within the slot at a first point when the wiper arm is in the first position and the second end of the first push rod slidably supported within the slot at a second point when the wiper arm is in the second position, wherein the distance between the second end of the first push rod and the pivot post axis at the first point is less than the distance between the second end of the first push rod and the pivot post axis at the second point.

According to another aspect of the present disclosure, the distance between the second end of the first push rod and the pivot post axis gradually increases between the first and second points.

BRIEF DESCRIPTION OF THE DRAWINGS

The drawings described herein are for illustration purposes only and are not intended to limit the scope of the present disclosure in any way.

FIG. 1 is a top view of a variable curvature wiper according to an exemplary embodiment;

FIG. 2 is side view of the variable curvature wiper shown in FIG. 1, wherein the wiper blade is substantially flat;

FIG. 3 is a side view of the variable curvature wiper shown in FIG. 1, wherein the wiper blade is flexed;

DETAILED DESCRIPTION

Figure 4:
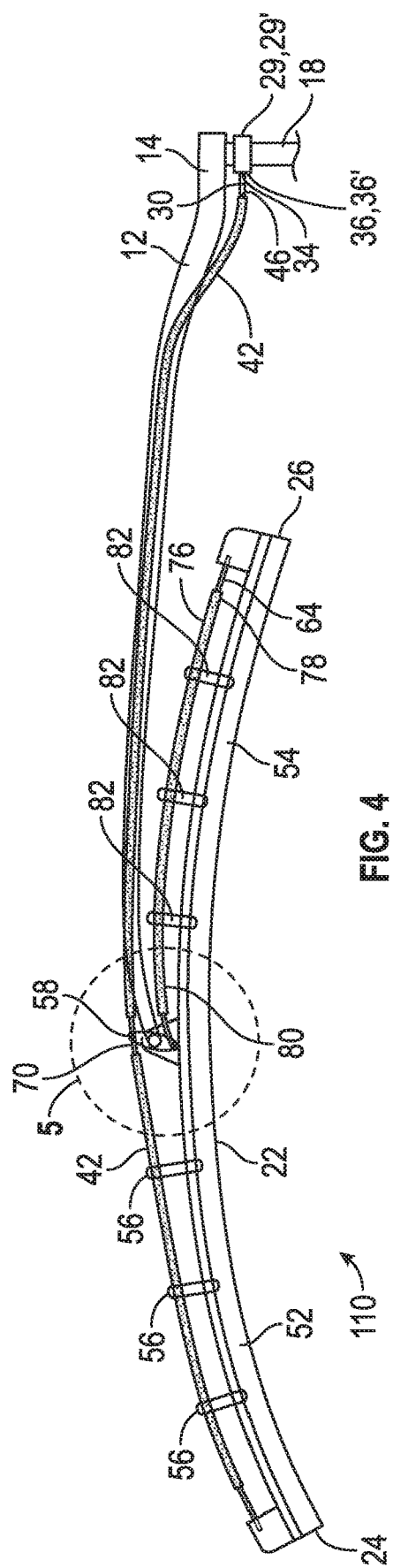
FIG. 4 is a variable curvature wiper according to another exemplary embodiment.

The following description is merely exemplary in nature and is not intended to limit the present disclosure, application, or uses.

Referring to FIGS. 1, 2 and 3, a variable curvature wiper 10 of the present disclosure is shown generally at 10. The variable curvature wiper 10 includes a wiper arm 12 having a first distal end 14 and a second distal end 16. The first distal 14 end of the wiper arm 12 is pivotally supported on a pivot post 18. During operation of the variable curvature wiper 10 the wiper arm 12 pivots on the pivot post 18 about a pivot post axis 20.

A flexible wiper blade 22 is mounted onto the second distal end 16 of the wiper arm 12. The flexible wiper blade 22 has a first end 24, a second end 26 and a mounting hub 28 positioned between the first and second ends 24, 26. The mounting hub 28 is pivotally attached to the second distal end 16 of the wiper arm 12. A cam 29 is fixedly mounted onto the pivot post 20. A first push rod 30 is supported on the variable curvature wiper 10. A first end 32 of the first push rod 30 is attached to the first end 24 of the wiper blade 22. A second end 34 of the first push rod 30 is in slidable engagement with a cam surface 36 of the cam 29.

Figure 6:
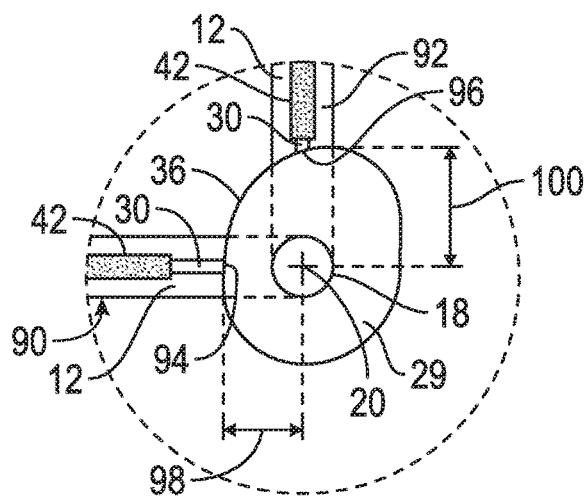
FIG. 6 is an enlarged portion of FIG. 2, with a cam of one exemplary embodiment.

The cam 29 has an offset curved shape. The distance from the cam surface 36 to the pivot post axis 20 varies along the length of the cam surface 36. Referring to FIGS. 1 and 6, when the wiper arm 12 is in a first position (shown at 90 in FIGS. 1 and 6), the second end 34 of the first push rod 30 slidably engages the cam surface 36 at a first point 94. When the wiper arm 12 is in a second position (shown in phantom at 92 in FIGS. 1 and 6), the second end 34 of the first push rod 30 slidably engages the cam surface 36 at a second point 96. A first distance 98 between the cam surface 36 and the pivot post axis 20 at the first point 94 is less than a second distance 100 between the cam surface 36 and the pivot post axis 20 at the second point 96. The distance between the cam surface 36 and the pivot post axis 20 gradually increases between the first and second points 94, 96.

When the variable curvature wiper 10 is in the first position 90, the first push rod 30 travels a distance between the cam surface 36 and the first end 24 of the wiper blade 22. In the first position, there is no compression within the first push rod 30, and the wiper blade 22 is substantially flat, as shown in FIG. 2. As the variable curvature wiper 10 moves from the first position 90 toward the second position 92, the wiper arm 12 pivots about the pivot post axis 20 in a first direction 38. Because the distance between the cam surface 36 and the pivot post axis 20 increases, pivotal motion of the wiper arm 12 in the first direction 38 decreases the distance between the cam surface 36 and the first end 24 of the wiper blade 22. The shortened distance creates compression of the first push rod 30, causing the first push rod 30 to push against the first end 24 of the wiper blade 22. When the first push rod 30 pushes against the first end 24 of the wiper blade 22, the wiper blade 22 flexes away from a substantially flat position, as shown in FIG. 2, to a curved profile, as shown in FIG. 3. As the wiper arm 12 pivots further away from the first position 90, the distance between the cam surface 36 and the first end 24 of the wiper blade 22 continues to decrease, causing the wiper blade 22 to flex further away from a substantially flat position.

When the variable curvature wiper 10 moves back toward the first position 90, the wiper arm 12 pivots about the pivot post axis 20 in a second direction 40. Pivotal motion of the wiper arm 12 in the second direction 40 increases the distance between the cam surface 36 and the first end 24 of the wiper blade 22. The increased distance removes the compression from the first push rod 30 and allows the wiper blade 22 to flex back to a substantially flat position, shown in FIG. 2.

Figure 7:
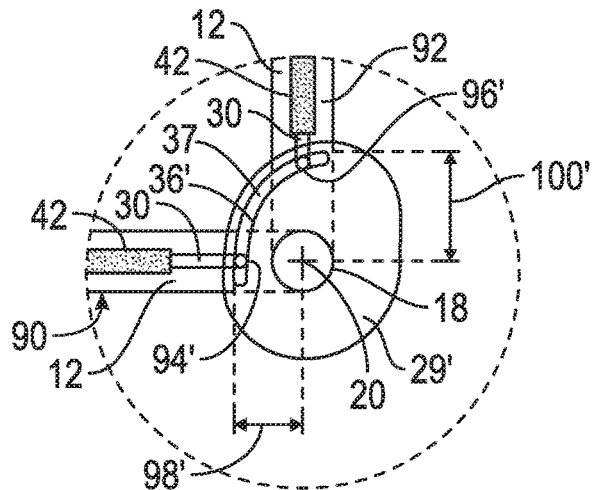
FIG. 7 is an enlarged portion of FIG. 2, with a cam of another exemplary embodiment.
Figure 8:
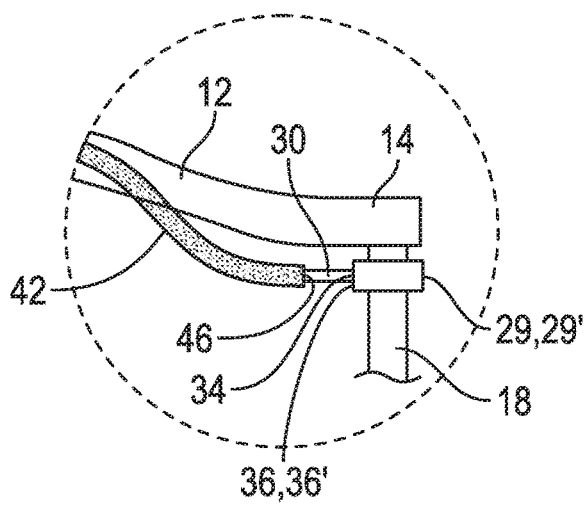
FIG. 8 is a side view of the enlarged portion shown in FIG. 7.

Referring to FIG. 7, in an alternative exemplary embodiment, the second end 34 of the first push rod 30 is slidably attached to the cam surface 36' of the cam 29'. The cam 29' includes a slot 37 formed therein. The second end 34 of the first push rod 30 is slidably supported within the slot 37. The cam 29' and the slot 37 have an offset curved shape. The distance from the cam surface 36' to the pivot post axis 20' varies along the length of the cam surface 36'. Referring to FIGS. 1 and 7, when the wiper arm 12 is in the first position 90, the second end 34 of the first push rod 30 slidably engages the cam surface 36' at a first point 94'. When the wiper arm 12 is in a second position 92, the second end 34 of the first push rod 30 slidably engages the cam surface 36' at a second point 96'. A first distance 98' between the cam surface 36' and the pivot post axis 20 at the first point 94' is less than a second distance 100' between the cam surface 36' and the pivot post axis 20 at the second point 96'. The distance between the cam surface 36' and the pivot post axis 20 gradually increases between the first and second points 94', 96'.

When the variable curvature wiper 10 is in the first position 90, the first push rod 30 travels a distance between the cam surface 36' and the first end 24 of the wiper blade 22. In the first position 90, there is no compression within the first push rod 30, and the wiper blade 22 is substantially flat, as shown in FIG. 2. As the variable curvature wiper 10 moves from the first position 90 toward the second position 92, the wiper arm 12 pivots about the pivot post axis 20 in a first direction 38, and the second end 34 of the first push rod 30 slides within the slot 37 from the first point 94' toward the second point 96'. Because the distance between the cam surface 36' and the pivot post axis 20 increases, pivotal motion of the wiper arm 12 in the first direction 38 decreases the distance between the cam surface 36' and the first end 24 of the wiper blade 22. The shortened distance creates compression of the first push rod 30, causing the first push rod 30 to push against the first end 24 of the wiper blade 22. When the first push rod 30 pushes against the first end 24 of the wiper blade 22, the wiper blade 22 flexes away from a substantially flat position, as shown in FIG. 2, to a curved profile, as shown in FIG. 3. As the wiper arm 12 pivots further away from the first position 90, the distance between the cam surface 36' and the first end 24 of the wiper blade 22 continues to decrease, causing the wiper blade 22 to flex further away from a substantially flat position.

Pivotal motion of the wiper arm 12 about the pivot post axis 20 in the second direction 40 increases the distance between the cam surface 36' and the first end 24 of the wiper blade 22 causing the cam 29 to pull the first push rod 30. Pulling the first push rod 30 creates tension in the first push rod 30, causing the first push rod 30 to pull against the first end 24 of the wiper blade 22. When the first push rod 30 pulls against the first end 24 of the wiper blade 22, the wiper blade 22 flexes back toward the substantially flat position shown in FIG. 2. As the wiper arm 12 pivots toward the first position 90, the distance between the cam surface 36' and the first end 24 of the wiper blade 22 continues to increase, causing the wiper blade 22 to flex further toward a substantially flat position, until finally the variable curvature wiper blade 10 is pivoted back to the first position 90 and the wiper blade 22 is substantially flat, as shown in FIG. 2.

A first hollow tube 42 is supported on the wiper arm 12 and the wiper blade 22. The first hollow tube 42 has a first end 44 fixedly attached to the wiper blade 22 at a distance from the first end 24 of the wiper blade 22. The first hollow tube 42 has a second end 46 fixedly attached to the wiper arm 12 at a distance from the first distal end 14 of the wiper arm 12. The first push rod 30 is slidably supported within the first hollow tube 42. The first end 32 of the first push rod 30 extends from the first end 44 of the first hollow tube 42. The second end 34 of the first push rod 30 extends from the second end 46 of the first hollow tube 42.

Because the cam surface 36, 36' is spaced from the pivot post axis 20, pivotal motion of the wiper arm 12 in the first direction 38 decreases the distance between the cam surface 36, 36' and the second end 46 of the first hollow tube 42. As the distance between the cam surface 36, 36' and the second end 46 of the first hollow tube 42 decreases, the first push rod 30 slides into the second end 44 of the first hollow tube 42 and extends further out from the first end 44 of the first hollow tube 42. As the first push rod 30 extends from the first end 44 of the first hollow tube 42, the first push rod 30 pushes against the first end 24 of the wiper blade 22 and flexes the wiper blade 22 away from the substantially flat position. As the wiper arm 12 pivots further away from the first position, the distance between the cam surface 36, 36' and the second end 46 of the first hollow tube 42 continues to decrease, causing the wiper blade 22 to flex further away from a substantially flat position. The first hollow tube 42 is semi-rigid, wherein the first hollow tube 42 is rigid enough to support the hollow tube shape and not collapse, and is flexible enough to allow the first hollow tube 42 to flex along with the wiper blade 22.

Alternatively, when the variable curvature wiper 10 moves back toward the first position, the wiper arm 12 pivots about the pivot post axis 20 in the second direction 40. Pivotal motion of the wiper arm 12 in the second direction 40 increases the distance between the cam surface 36, 36' and the second end 46 of the first hollow tube 42. The increased distance creates tension in the first push rod 30, pulling the first push rod 30 into the first end 44 of the first hollow tube 42 and out from the second end 46 of the first hollow tube 42, and pulling the first end 24 of the wiper blade 22 back toward a substantially flat position. As the wiper arm 12 pivots toward the first position, the distance between the cam surface 36, 36' and the second end 46 of the first hollow tube 42 continues to increase, causing the wiper blade 22 to flex further toward a substantially flat position, until finally the variable curvature wiper blade 10 is pivoted back to the first position and the wiper blade 22 is substantially flat.

The wiper arm 12 pivots about the pivot post axis 20 in a first plane 48 that extends through the wiper arm 12. The first plane 48 is substantially parallel to the surface of a windshield that the wiper blade 22 is meant to engage. The wiper blade 22 pivots about the second distal end 16 of the wiper arm 12 in a second plane 50 that also extends through the wiper arm 12, substantially perpendicular to the first plane 48.

The wiper blade 22 includes a first section 52 and a second section 54. The first section 52 of the wiper blade 22 extends between the first end 24 of the wiper blade 22 and the mounting hub 28. The second section 54 of the wiper blade 22 extends between the mounting hub 28 and the second end 26 of the wiper blade 22. When the first push rod 30 pushes or pulls the first end 24 of the wiper blade 22, the first section 52 of the wiper blade 22 flexes. Only the first section 52 flexes because the first push rod 30 only acts on the first end 24 of the wiper blade 22. The second section 54 of the wiper blade 22 remains substantially flat, even when the first section 52 flexes.

The first hollow tube 42 is supported by the wiper arm 12 and the first section 52 of the wiper blade 22. A plurality of stand-offs 56 support the portion of the first hollow tube 42 that extends from the second distal end 16 of the wiper arm 12 to the first end 44 of the first hollow tube 42.

The first push rod 30 must transmit pushing and pulling forces to the first end 24 of the wiper blade 22, and must be flexible enough to follow the contour of the wiper blade 22 as the wiper blade 22 flexes. The first push rod 30 is made from a material that does not allow the first push rod 30 to stretch or to compress but can flex. One example of a suitable material is a braided wire cable. Such a cable is stiff enough to transmit pushing and pulling forces to the first end 24 of the wiper blade 22, but still flexible enough to accommodate flexing of the wiper blade 22.

Figure 5:
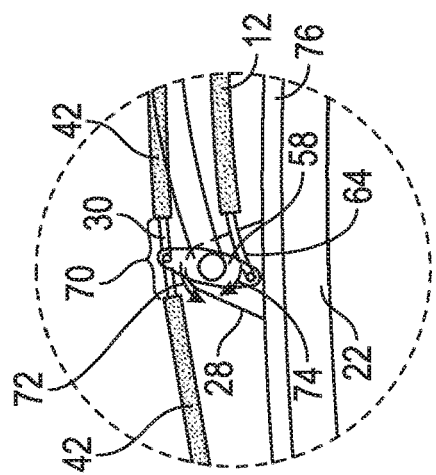
FIG. 5 is an enlarged portion of FIG. 4.

Referring to FIGS. 4 and 5, in another embodiment of the present disclosure, the variable curvature wiper 110 includes a lever hub 58 pivotally mounted at the second distal end 16 of the wiper arm 12. The lever hub 58 is pivotal about a common axis with the wiper blade 22 and independently of the wiper blade 22. The lever hub 58 includes a first lever arm 60 that extends radially from the lever hub 58 and a second lever arm 62 that extends radially from the lever hub 58, opposite the first lever arm 60.

A second push rod 64 has a first end 66 attached to the second end 26 of the wiper blade 22 and a second end 68 attached to the second lever arm 62. The first lever arm 60 is pivotally attached to the first push rod 30. The first hollow tube 42 includes a cut-out section 70 to allow attachment of the first lever arm 60 to the first push rod 30. When the first push rod 30 slides toward the first end 24 of the wiper blade 22 the lever hub 58 rotates in a first direction 72. When the lever hub 58 rotates, the second lever arm 62 pushes the second push rod 64 toward the second end 26 of the wiper blade 22. When the second push rod 64 pushes against the second end 26 of the wiper blade 22, the second section 54 of the wiper blade 22 flexes away from a substantially flat position. Alternatively, when the first push rod 30 slides away from the first end 24 of the wiper blade 22, the lever hub 58 rotates in a second direction 74, opposite the first direction 72. When the lever hub 58 rotates in the second direction 74, the second lever arm 62 pulls the second push rod 64 away from the second end 26 of the wiper blade 22. When the second push rod 64 pulls the second end 26 of the wiper blade 22, the second section 54 of the wiper blade 22 flexes back toward a substantially flat position.

A second hollow tube 76 is supported on the second section 54 of the wiper blade 22. The second hollow tube has a first end 78 fixedly attached to the second section 54 of the wiper blade 22 at a distance from the second end 26 of the wiper blade 22 and a second end 80 attached to the second section 54 of the wiper blade 22 at a distance from the lever hub 58. The second push rod 64 is slidably supported within the second hollow tube 76. The first end 66 of the second push rod 64 extends from the first end 78 of the second hollow tube 76 and the second end 68 of the second push rod 64 extends from the second end 80 of the second hollow tube 76.

When the first push rod 30 slides toward the first end 24 of the wiper blade 22 the lever hub 58 rotates in the first direction 72. When the lever hub 58 rotates in the first direction 72, the second lever arm 62 pushes the second push rod 64 into the first end 78 of the second hollow tube 76 and out from the second end 80 of the second hollow tube 76 toward the second end 26 of the wiper blade 22. When the second push rod 64 pushes against the second end 26 of the wiper blade 22, the second section 54 of the wiper blade 22 flexes away from the substantially flat position shown in FIG. 2. As the first push rod 30 slides further toward the first end 24 of the wiper blade 22, the lever hub 58 continues to rotate causing the second lever arm 62 to push further against the second end 26 of the wiper blade 22, causing the second section 54 of the wiper blade 22 to flex further, as shown in FIG. 3.

Alternatively, when the first push rod 30 slides away from the first end 24 of the wiper blade 22, the lever hub 58 rotates in the second direction 74, opposite the first direction 72. When the lever hub 58 rotates in the second direction 74, the second lever arm 62 pulls the second push rod 64 into the second end 80 of the second hollow tube 76 and out from the first end 78 of the second hollow tube 76, away from the second end 26 of the wiper blade 22. When the second push rod 64 pulls the second end 26 of the wiper blade 22, the wiper blade 22 flexes blade back toward a substantially flat position.

As the first push rod 30 slides away from the first end 24 of the wiper blade 22, the lever hub 58 continues to rotate further in the second direction 74, and the second lever arm 62 continues to pull the second push rod 64 away from the second end 26 of the wiper blade 22. The second section 54 of the wiper blade 22 continues to flex back until the wiper blade 22 is substantially flat.

The wiper blade 22 pivots relative to the second distal end 16 of the wiper arm 12 in the second plane 50, and the first and second sections 52, 54 of the wiper blade 22 flex within the second plane 50. When in use, the wiper blade 22 rests on the surface of a windshield that is substantially parallel to the first plane 48. Flexing of the first and second sections 52, 54 of the wiper blade 22 in the second plane 50 forces the ends 24, 26 of the wiper blade 22 toward the surface of the windshield, keeping the wiper blade 22 in contact with the windshield even though the surface of the windshield may have a varying curved profile. The first and second sections 52, 54 of the wiper blade 22 are adapted to flex as needed to ensure the wiper blade 22 can contour to a compound curved shape and remain engaged with the surface of a windshield.

The second hollow tube 76 is supported by the second section 54 of the wiper blade 22. A plurality of stand-offs 82 support the second hollow tube 76 on the second section 54 of the wiper blade 22.

The second push rod 64 must transmit pushing and pulling forces to the second end 26 of the wiper blade 22, and must be flexible enough to follow the contour of the wiper blade 22 as the wiper blade 22 flexes. The second push rod 64 is made from a material that does not allow the second push rod 64 to stretch or to compress but can flex.

One example of a suitable material is a braided wire cable. Such a cable is stiff enough to transmit pushing and pulling forces to the second end 26 of the wiper blade 22, but still flexible enough to accommodate flexing of the wiper blade 22.

A variable curvature wiper 10, 110 of the present disclosure offers several advantages. Windshields in vehicles vary in size and shape depending on the type of vehicle. The variable curvature wiper 10, 110 provides a wiper blade 22 that not only is able to flex and remain in contact with a windshield that has a compound curved profile, but actually forces the wiper blade 22 to flex toward the surface of the windshield as the wiper arm 12 moves through a range of motion. This will keep the wiper blade 22 in firm contact with the surface of the windshield and will counter other forces that might act on the wiper blade 22 to cause it to lift away from the surface of the windshield, such as wind, water or debris.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A variable curvature wiper, comprising:
   a wiper arm having a first distal end and a second distal end, the first distal end pivotally supported on a pivot post, wherein the wiper arm pivots about a pivot post axis;
   a flexible wiper blade having a first end, a second end and a mounting hub positioned between the first and second ends, wherein the mounting hub is pivotally attached to the second distal end of the wiper arm;
   a cam fixedly mounted onto the pivot post;
   a first hollow tube supported on the wiper arm and the wiper blade, the first hollow tube including a first end fixedly attached to the wiper blade at a distance from the first end of the wiper blade and a second end fixedly attached to the wiper arm at a distance from the first distal end of the wiper arm:
   a first push rod including a first end and a second end, the first push rod slidably supported within the first hollow tube, the first end of the first push rod extending from the first end of the first hollow tube and the second end of the first push rod extending from the second end of the first hollow tube;
   the first end of the first push rod being attached to the first end of the wiper blade;
   the second end of the first push rod being in slidable engagement with a cam surface of the cam;
   wherein pivotal motion of the wiper arm about the pivot post axis in a first direction decreases the distance between the cam surface and the second end of the first hollow tube, causing the first push rod to slide into the second end of the first hollow tube, extend further out from the first end of the first hollow tube and push against the first end of the wiper blade and flexing the wiper blade away from a substantially flat position, and pivotal motion of the wiper arm about the pivot post axis in a second direction increases the distance between the cam surface and the second end of the first hollow tube.

2. The variable curvature wiper of claim 1, wherein the wiper arm pivots about the pivot post axis in a first plane extending through the wiper arm, and the wiper blade pivots about the second distal end of the wiper arm in a second plane extending through the wiper arm substantially perpendicular to the first plane.

3. The variable curvature wiper of claim 2, wherein the wiper blade includes a first section extending between the first end of the wiper blade and the mounting hub, and a second section extending between the mounting hub and the second end of the wiper blade, wherein when the first push rod pushes the first end of the wiper blade, the first section of the wiper blade flexes, and the second section of the wiper blade remains substantially flat.

4. The variable curvature wiper of claim 3, further including a plurality of stand-offs spaced along a top surface of the first section of the wiper blade, wherein the first hollow tube is supported by the plurality of stand-offs.

5. The variable curvature wiper of claim 4, wherein the first push rod is made from a material that does not allow the first push rod to stretch or to compress, and is flexible, wherein the first push rod flexes as the wiper blade flexes, and pushing and pulling forces on the first push rod are transmitted to the first end of the wiper blade.

6. The variable curvature wiper of claim 5, further including:
   A lever hub pivotally mounted at the second distal end of the wiper arm and pivotal about a common axis with the wiper blade and independently of the wiper blade, the lever hub including a first lever arm extending from the lever hub and a second lever arm extending from the lever hub, opposite the first lever arm,
   a second push rod including a first end attached to the second end of the wiper blade and a second end attached to the second lever arm, wherein the first lever arm is pivotally attached to the first push rod;
   wherein when the first push rod slides toward the first end of the wiper blade the lever hub rotates and the second lever arm pushes the second push rod toward the second end of the wiper blade, flexing the second section of the wiper blade away from a substantially flat position, further wherein when the first push rod slides away from the first end of the wiper blade, the lever hub rotates and the second lever arm pulls the second push rod away from the second end of the wiper blade, flexing the second section of the wiper blade back toward a substantially flat position.

7. The variable curvature wiper of claim 6, wherein the first hollow tube includes a cut-out section to allow attachment of the first lever arm to the first push rod.

8. The variable curvature wiper of claim 7, further comprising:
   a second hollow tube supported on the second section of the wiper blade, the second hollow tube including a first end fixedly attached to the second section of the wiper blade at a distance from the second end of the wiper blade and a second end attached to the second section of the wiper blade at a distance from the lever hub;
   wherein the second push rod is slidably supported within the second hollow tube, the first end of the second push rod extending from the first end of the second hollow tube and the second end of the second push rod extending from the second end of the second hollow tube.

9. The variable curvature wiper of claim 8, wherein the first and second sections of the wiper blade flex within the second plane extending through the wiper arm substantially perpendicular to the first plane.

10. The variable curvature wiper of claim 9, wherein the wiper blade is adapted to allow the first and second sections of the wiper blade to flex within the second plane to a compound curved shape.

11. The variable curvature wiper of claim 10, further including a plurality of stand-offs spaced along a top surface of the second section of the wiper blade, wherein the second hollow tube is supported by the plurality of stand-offs.

12. The variable curvature wiper of claim 11, wherein the second push rod is made from a material that does not allow the second push rod to stretch or to compress, and is flexible, wherein the second push rod flexes as the wiper blade flexes, and pushing and pulling forces on the second push rod are transmitted to the second end of the wiper blade.

13. The variable curvature wiper of claim 1, wherein the cam has an offset curved shape, the first push rod slidably engaging the cam surface at a first point when the wiper arm is in a first position and the first push rod slidably engaging the cam surface at a second point when the wiper arm is in a second position.

14. The variable curvature wiper of claim 13, wherein the distance between the cam surface and the pivot post axis at the first point is less than the distance between the cam surface and the pivot post axis at the second point.

15. The variable curvature wiper of claim 14, wherein the distance between the cam surface and the pivot post axis gradually increases between the first and second points.

16. The variable curvature wiper of claim 1, wherein the second end of the first push rod is slidably attached to the cam surface of the cam; wherein pivotal motion of the wiper arm about the pivot post axis in a first direction decreases the distance between the cam surface and the first end of the wiper blade, causing the cam surface to push against the first push rod and causing the first push rod to push against the first end of the wiper blade and flexing the wiper blade away from a substantially flat position, and pivotal motion of the wiper arm about the pivot post axis in a second direction increases the distance between the cam surface and the first end of the wiper blade causing the cam surface to pull the first push rod and the first end of the wiper blade and flexing the wiper blade back toward a substantially flat position.

17. The variable curvature wiper of claim 16, wherein the cam includes a slot formed therein and the second end of the first push rod is slidably supported within the slot.

18. The variable curvature wiper of claim 17, wherein the cam and the slot formed therein has an offset curved shape, the second end of the first push rod slidably supported within the slot at a first point when the wiper arm is in the first position and the second end of the first push rod slidably supported within the slot at a second point when the wiper arm is in the second position, wherein the distance between the cam surface and the pivot post axis at the first point is less than the distance between the cam surface and the pivot post axis at the second point.

19. The variable curvature wiper of claim 18, wherein the distance between the cam surface and the pivot post axis gradually increases between the first and second points.

* * * * *